UNITED STATES PATENT OFFICE.

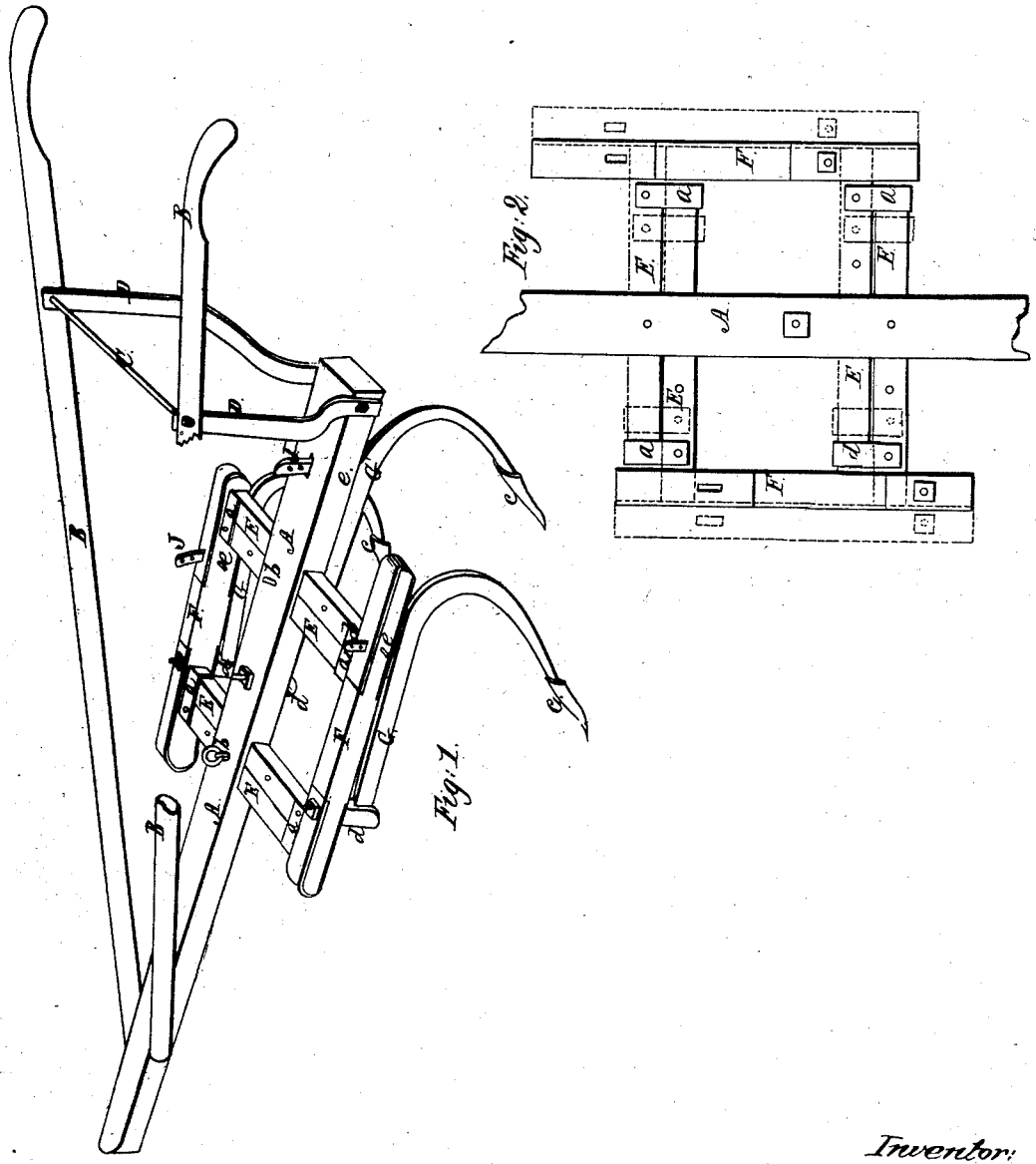

ALLEN HUGHES, OF GRATIOT, OHIO.

IMPROVEMENT IN CULTIVATING-PLOWS.

Specification forming part of Letters Patent No. 28,487, dated May 29, 1860.

*To all whom it may concern:*

Be it known that I, ALLEN HUGHES, of Gratiot, in the county of Licking and State of Ohio, have invented a new and useful Improvement in Shovel-Plows; and I do hereby declare that the following is a full, clear, and exact description thereof, reference being had to the accompanying drawings, forming a part of this specification, in which—

Figure 1 represents a perspective view of my improved cultivating-plow; Fig. 2, a plan view of a portion of the frame of the same, showing the parts in two positions.

Similar letters of reference indicate corresponding parts in both figures.

The object of this invention is to connect the shanks carrying the shovels to the frame or beams of the cultivator in such a manner that the same are not weakened by drilling holes through them, as in the common method; also, to attach two or a gang of shovels to the frame of the cultivator in such a manner that the same may be adjusted and set at different distances apart, according as it is desired to plant the crops.

The invention consists in jointing the front ends of the shanks to the beams of the cultivator in such a manner that the shovels may be raised or depressed, and in fixing the shovels in the shanks carrying them rigidly to the beams by sector-bars having pins passing through them and through the beams, as will be hereinafter described and represented.

It further consists, in conjunction with the mode of attaching the shovel-shanks to the beams, in making these beams adjustable in the central beam, so that they may be contracted or extended, and with them the shovels attached to them, as will be hereinafter described.

To enable those skilled in the art to fully understand my invention, I will proceed to describe its construction and operation.

In the drawings, A represents the central beam, to the front part of which is attached the ends of handles B B, which proceed back, and are supported and strengthened by brace-rod C and curved arms D D, which latter connect these handles with the rear end of the beam. Through the central beam, A, at two points, are cut mortises, through which pass transverse extension-bars E E E E, that are attached to two short beams, F F, that are parallel with the central beam, A. The bars E are connected at their ends together with metal straps *a a a a*, that serve to keep these bars well stayed, and by bolts *b b* they are rigidly attached to the central beam, A. These bars, with their beams, are capable of being extended or contracted by removing the pins *b b*. They may then be fixed to the central beam, A, as before stated.

To the central beam, as well as to the two side beams, F F, is attached the curved shovel-standards G G' G in the following novel manner.

*d d d* are perpendicular slotted portions projecting down from the beams that are screwed at suitable points to the three beams and secured by nuts, as represented in the drawings, and between the slots in the ends of these portions are bolted the ends of the curved standards G G' G. From these points or joints the standards proceed back, are curved, as represented, and receive the shovels *c c c* on their lower ends. At or near the rear part of the straight portions of these standard-bars they are attached to the beams again by curved upright portions J J J, having perforations through them, which pass up through suitable holes cut through the beams and receive pins or bolts *e e e*, that pass transversely through the beams and through one of the perforations in these plates. These curved or sector plates J are of a sufficient length to admit of any required adjustment being given to the shovels for running deeper or shallower into the earth. The shovels may be set as represented in the drawings, one being behind the other, or in any other desirable way.

From this description it will be seen that my cultivator is capable of being adjusted laterally or vertically—laterally for working the earth in rows of any desirable width (by removing the middle shovel the rows may be made still wider) and vertically for working at any depth required.

The most important object in the sector-plates J is to dispense with the holes usually made in the shank or standard-bar, that weaken this bar so much that it is very liable to break where these holes occur. By the employment of such projections greater facility of adjustment is obtained, while the shank or shovel-bar is not required.

The operation of this class of machinery for the cultivation of corn crops is too well understood to need further explanation. It is only necessary to say that these adjustments are very important where crops are sown irregular, and require to be frequently made. This machine will answer the requirements and save much hard labor.

Having thus described my invention, what I claim, and desire to secure by Letters Patent, is—

The shovel cultivator herein described, capable of both a lateral and a vertical adjustment, when made in the manner and by the combined arrangement herein described and represented.

ALLEN HUGHES.

Witnesses:
JAMES WILEY,
JOSEPH WHITE.